(12) United States Patent
Noh et al.

(10) Patent No.: US 9,859,577 B2
(45) Date of Patent: Jan. 2, 2018

(54) HYDROGEN FEED AND RECIRCULATION DEVICE FOR FUEL CELL SYSTEM

(71) Applicant: Hyundai Motor Company, Seoul (KR)

(72) Inventors: Yong Gyu Noh, Gyeonggi-do (KR); Sun Bo Shim, Seoul (KR); Se Kwon Jung, Seoul (KR)

(73) Assignee: Hyundai Motor Company, Seoul (KR)

( * ) Notice: Subject to any disclaimer, the term of this patent is extended or adjusted under 35 U.S.C. 154(b) by 204 days.

(21) Appl. No.: 14/960,341

(22) Filed: Dec. 5, 2015

(65) Prior Publication Data

US 2017/0077532 A1    Mar. 16, 2017

(30) Foreign Application Priority Data

Sep. 16, 2015    (KR) .................. 10-2015-0130704

(51) Int. Cl.

| | |
|---|---|
| *H01M 8/04* | (2016.01) |
| *H01M 8/04082* | (2016.01) |
| *H01M 8/04089* | (2016.01) |
| *H01M 8/04537* | (2016.01) |
| *H01M 8/04746* | (2016.01) |

(52) U.S. Cl.
CPC ... *H01M 8/04201* (2013.01); *H01M 8/04097* (2013.01); *H01M 8/04604* (2013.01); *H01M 8/04753* (2013.01); *H01M 2250/20* (2013.01); *Y02T 90/32* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,047,208 | A * | 7/1962 | Coanda .................. | D02G 1/161 |
| | | | | 239/DIG. 7 |
| 4,678,428 | A * | 7/1987 | Tanaka ................... | F04F 5/463 |
| | | | | 431/355 |
| 4,721,126 | A * | 1/1988 | Horii ..................... | B65G 53/58 |
| | | | | 137/1 |
| 5,533,487 | A * | 7/1996 | Cailey .................... | F02B 47/08 |
| | | | | 123/568.17 |
| 6,182,440 | B1 * | 2/2001 | Bilenas .................. | F02K 1/825 |
| | | | | 239/127.1 |
| 6,730,177 | B1 * | 5/2004 | Talley .................... | B08B 3/02 |
| | | | | 134/34 |

(Continued)

FOREIGN PATENT DOCUMENTS

| | | |
|---|---|---|
| JP | 06-146262 A | 5/1994 |
| JP | 2007-522386 A | 8/2007 |

(Continued)

*Primary Examiner* — Kaity Chandler
(74) *Attorney, Agent, or Firm* — Mintz Levin Cohn Ferris Glovsky and Popeo, P.C.; Peter F. Corless

(57) ABSTRACT

A hydrogen feed and recirculation device for a fuel cell system supplies hydrogen from a hydrogen tank and unreacted recirculated hydrogen discharged from a stack to the stack. The hydrogen feed and recirculation device can supply hydrogen to the stack through a first nozzle when hydrogen supply pressure is low and supply the hydrogen to the stack through a second nozzle using a Coanda Effect other than the first nozzle when the hydrogen supply pressure is high to satisfy a required hydrogen supply amount through an entire operating area of the fuel cell and prevent nozzle vibration and noise generation.

9 Claims, 9 Drawing Sheets

(56) References Cited

U.S. PATENT DOCUMENTS

| | | | | |
|---|---|---|---|---|
| 8,668,449 | B2 * | 3/2014 | Orosa | F01D 25/30 415/211.2 |
| 2001/0024747 | A1 * | 9/2001 | Sang | H01M 8/04089 429/415 |
| 2007/0154855 | A1 * | 7/2007 | Gibson | F23C 9/006 431/9 |
| 2007/0259226 | A1 * | 11/2007 | Sang | F04F 5/18 429/415 |
| 2008/0081304 | A1 * | 4/2008 | Poe | F23G 7/08 431/202 |
| 2009/0142644 | A1 * | 6/2009 | Osborne | F01D 15/10 429/415 |
| 2009/0314000 | A1 * | 12/2009 | Evulet | F23D 14/62 60/772 |
| 2010/0136454 | A1 * | 6/2010 | Heidrich | H01M 8/04097 429/443 |
| 2011/0058939 | A1 * | 3/2011 | Orosa | F01D 25/305 415/208.1 |
| 2011/0212371 | A1 * | 9/2011 | Itoga | H01M 8/04097 429/414 |

FOREIGN PATENT DOCUMENTS

| | | |
|---|---|---|
| KR | 10-2001-0033657 A | 4/2001 |
| KR | 10-2010-0016860 A | 2/2010 |
| KR | 10-2014-0058698 | 5/2014 |
| KR | 10-1453859 B1 | 11/2014 |
| KR | 10-2015-0078010 A | 7/2015 |
| KR | 10-2015-0089449 A | 8/2015 |

* cited by examiner

Coander effect

MULTIPLE SLIT HOLES (INTERVAL OF APPROXIMATELY 20 TO 30°)[Clearance 0.1mm]

SLIT HOLES HAVING INTERVAL OF 60° [Clearance 0.15mm]

SLIT HOLES HAVING INTERVAL OF 90° [Clearance 0.2mm]

SLIT HOLES HAVING INTERVAL OF 120° [Clearance 0.25mm]

-HYDROGEN SPEED DISTRIBUTION IN WHICH FIRST NOZZLE IS POSITIONED AT CENTER-

−HYDROGEN SPEED DISTRIBUTION BY SECOND NOZZLE
IN COANDER FORM WITHOUT FIRST NOZZLE−

HYDROGEN FEED AND RECIRCULATION DEVICE FOR FUEL CELL SYSTEM

CROSS-REFERENCE TO RELATED APPLICATION

This application claims under 35 U.S.C. §119(a) the benefit of Korean Patent Application No. 10-2015-0130704 filed on Sep. 16, 2015, the entire contents of which are incorporated herein by reference.

BACKGROUND

(a) Technical Field

The present invention relates to a hydrogen feed and recirculation device for a fuel cell system, and more particularly, to a hydrogen feed and recirculation device for a fuel cell system which supplies hydrogen from a hydrogen tank and unreacted recirculated hydrogen discharged from a stack to the stack.

(b) Description of the Related Art

In general, a fuel cell system includes a fuel cell stack generating electric energy, a fuel supply system supplying new fuel (hydrogen) and recirculated hydrogen to the fuel cell stack, an air supply system supplying oxygen in the air as an oxidizer required for an electrochemical reaction to the fuel cell stack, a cooling system removing reaction heat of the fuel cell stack to the outside of the system and controlling an operating temperature of the fuel cell stack, and the like.

Referring to FIG. 1 (RELATED ART), a fuel supply system among the components of a fuel cell system is configured to include a hydrogen supply line 110 connected to a hydrogen tank 100, a hydrogen recirculation line 120 in which hydrogen unreacted in a fuel cell stack (hereinafter referred to as a "stack") 170 is recirculated, ejectors 140a and 140b mounted at points where the stack inlet 130 and the hydrogen recirculation line 120 meet so as to pump and supply the new hydrogen and the recirculated hydrogen to an anode of the fuel cell stack, a stack inlet-side pressure sensor 150 mounted on the stack inlet 130 and measuring hydrogen and air pressure, a regulator 160 mounted on the hydrogen supply line 110, and the like.

Herein, the ejectors 140a and 140b serve to eject compressed hydrogen supplied from the hydrogen storage tank 100 to the stack through a nozzle and generate vacuum suction force and receive the unreacted hydrogen discharged from the fuel cell stack by the vacuum suction force and recirculate the received unreacted hydrogen to the stack.

In the fuel cell system, a blower can be used as a means for hydrogen recirculation, but the blower has disadvantages in that the blower is expensive as a motor based actuator, and there is a high possibility that a bearing or other components in the blower will be corroded by condensate water of recirculated gas and further, a problem in that when rotating components in the blower are fixed by the condensate water, in which the fixed rotating components are melted by a heater, significantly increases.

In order to solve the above problem, an ejector is used as a means for supplying the new hydrogen and the recirculated hydrogen to the stack.

The ejector jets hydrogen of approximately 100 barg, which flows to a rear end of a high-pressure regulator from the hydrogen tank and generates a momentum (vacuum suction force) required for the hydrogen recirculation to supply the new hydrogen from the hydrogen tank and the recirculated hydrogen from the stack to the stack, but when a nozzle diameter of the ejector increases, a jet speed decreases, and as a result, suction performance significantly deteriorates.

Due to such reasons, decreasing the nozzle size of the ejector is advantageous in hydrogen supply performance, but an area of a nozzle neck needs to be large in order to supply a large flow having a large load.

Therefore, as illustrated in FIG. 1, the ejector 140a having a large nozzle neck and the ejector 140b having a small nozzle neck are together disposed at a point where the stack inlet 130 and the hydrogen recirculation line 120 meet.

As a result, according to the hydrogen flow load which acts on the ejector, when the load is small, the small ejector 140b is used and when the load is large, the large ejector 140a is selectively used.

However, there is a disadvantage in that a separate valve or a control device for selecting the ejector is required and a problem in that spaces occupied by two ejectors are required.

In order to solve the problem, the present applicant has proposed an ejector of a fuel cell system in which a large nozzle and a small nozzle are combined into one pilot valve, and as a result, the small nozzle and the large nozzle are automatically selected according to a downstream hydrogen pressure of a flow control valve (Korean Patent Application No. 10-2014-0058698 (May 16, 2014)).

However, since the large nozzle and the small nozzle are arranged in an outer-diameter part and an inner-diameter part in a narrow space of the pilot valve, there is a disadvantage in that an assembly process thereof is complicated, a disadvantage in that the large nozzle and the small nozzle are together exposed to high-speed hydrogen gas, and as a result, pressure loss in each nozzle occurs, and further, a problem in that the small nozzle generates noise together with vibration by the high-speed hydrogen gas.

The above information disclosed in this Background section is only for enhancement of understanding of the background of the invention and therefore it may contain information that does not form the prior art that is already known in this country to a person of ordinary skill in the art.

SUMMARY

The present invention provides a hydrogen feed and recirculation device for a fuel cell system which can supply hydrogen to a stack through a first nozzle when hydrogen supply pressure is low and supply the hydrogen to the stack through a second nozzle using a Coanda Effect other than the first nozzle when the hydrogen supply pressure is high to satisfy a required hydrogen supply amount through an entire operating area of a fuel cell and prevent nozzle vibration and noise generation.

In one aspect, the present invention provides a hydrogen feed and recirculation device for a fuel cell system, including: a first hydrogen supply block having a hydrogen supply path through which hydrogen from a hydrogen tank passes; a flow control valve attached to the top of the first hydrogen supply block to open/close the hydrogen supply path; a second hydrogen supply block provided in a structure having a first hydrogen branch path and a second hydrogen branch path which are in communication with the hydrogen supply path of the first hydrogen supply block and attached to the bottom of the first hydrogen supply block; a recirculation hydrogen supply block provided in a structure having a recirculation hydrogen inlet for introducing recirculated hydrogen from a stack and attached to the bottom of the second hydrogen supply block; a pilot valve mounted to an end part of the second hydrogen branch path and the top of the recirculation hydrogen supply block; a first nozzle mounted on an end part of the first hydrogen branch path and disposed at the center of the recirculation hydrogen supply block; and a mixing diffusion pipe having a second nozzle inserted into and mounted on a proximal end of the recirculation hydrogen supply block and ejecting the hydrogen from the pilot valve by using a Coanda Effect, at a rear part of the mixing diffusion pipe and having a mixing path and a diffusion path supplying the hydrogen ejected from the first nozzle and the second nozzle to the stack at a front end of the mixing diffusion pipe.

In a preferred embodiment, the pilot valve may include a hollow bush provided in a hollow structure in which a hydrogen through groove is formed on a circumferential surface the pilot valve and seated in a mounting hole formed on the top of the recirculation hydrogen supply block, and a valve sheet inserted into the hollow bush to be elastically restored via a spring to open/close the second hydrogen branch path.

In another preferred embodiment, a suspension jaw on which the hollow bush is seated may be formed in a lower inner diameter of the mounting hole formed on the top of the recirculation hydrogen supply block.

In still another preferred embodiment, an extension pipe that extends to the center of the inner diameter of the recirculation hydrogen supply block may be formed at the end part of the first hydrogen branch path and the first nozzle is mounted on the end of the extension pipe.

In yet another preferred embodiment, the first nozzle may be disposed at the center of the second nozzle using the Coanda Effect.

In still yet another preferred embodiment, the second nozzle may be formed in a curved shape showing the Coanda Effect in order to direction-switch and eject the hydrogen from the pilot valve to the inner diameter of the mixing diffusion pipe and is integrally formed at a rear end of the mixing diffusion pipe in a circumferential direction.

In a further preferred embodiment, a guide partition forming a hydrogen passing clearance having a predetermined interval with the second nozzle may be integrally formed in the inner diameter part of the recirculation hydrogen supply block.

In another further preferred embodiment, a plurality of slit holes formed at an equal interval in a circumferential direction may be further formed in the second nozzle in order to control a hydrogen ejection amount. A fuel cell system can include: a hydrogen feed and recirculation device, including: a first hydrogen supply block having a hydrogen supply path through which hydrogen from a hydrogen tank passes; a flow control valve attached to the first hydrogen supply block to open/close the hydrogen supply path; a second hydrogen supply block provided in a structure having a first hydrogen branch path and a second hydrogen branch path which are in communication with the hydrogen supply path of the first hydrogen supply block and attached to the first hydrogen supply block; a recirculation hydrogen supply block provided in a structure having a recirculation hydrogen inlet for introducing recirculated hydrogen from a stack and attached to the second hydrogen supply block; a pilot valve mounted to the second hydrogen branch path and the recirculation hydrogen supply block; a first nozzle mounted on the first hydrogen branch path and disposed at the center of the recirculation hydrogen supply block; and a mixing diffusion pipe having a second nozzle inserted into and mounted on a proximal end of the recirculation hydrogen supply block and ejecting the hydrogen from the pilot valve by using a Coanda Effect at a rear part of the mixing diffusion pipe, and a mixing path and a diffusion path supplying the hydrogen ejected from the first nozzle and the second nozzle to the stack at a front end of the mixing diffusion pipe.

Through the aforementioned problem solving means, the present invention provides the following effects.

First, new hydrogen can be supplied to a stack through a first nozzle in a low-load operation condition (when hydrogen pressure is low) and recirculated hydrogen can be easily supplied to the stack together by ejection pressure of the first nozzle.

Second, the new hydrogen can be supplied to the stack through a second nozzle using a Coanda Effect in a medium/high-load operation condition (when the hydrogen pressure is high) other than the first nozzle and the recirculated hydrogen can be easily supplied to the stack together by ejection pressure of the first nozzle and the second nozzle.

Third, since the first nozzle is not exposed to high-speed hydrogen gas and the second nozzle can maintain a rigid state even against high-speed hydrogen gas by using the Coanda Effect, nozzle vibration and noise generation can be prevented.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
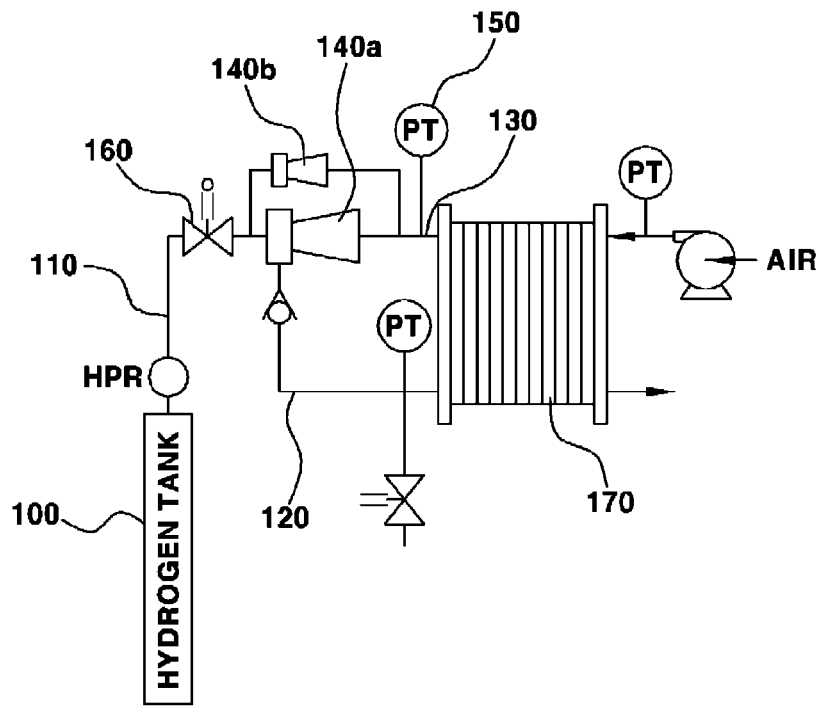
FIG. 1 (RELATED ART) is a schematic view illustrating a basic constitution of a fuel supply system for a fuel cell system.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, preferred embodiments of the present invention will be described in detail with reference to the accompanying drawings.

First, a Coanda Effect is described below in order to help understand the present invention.

Figure 2:
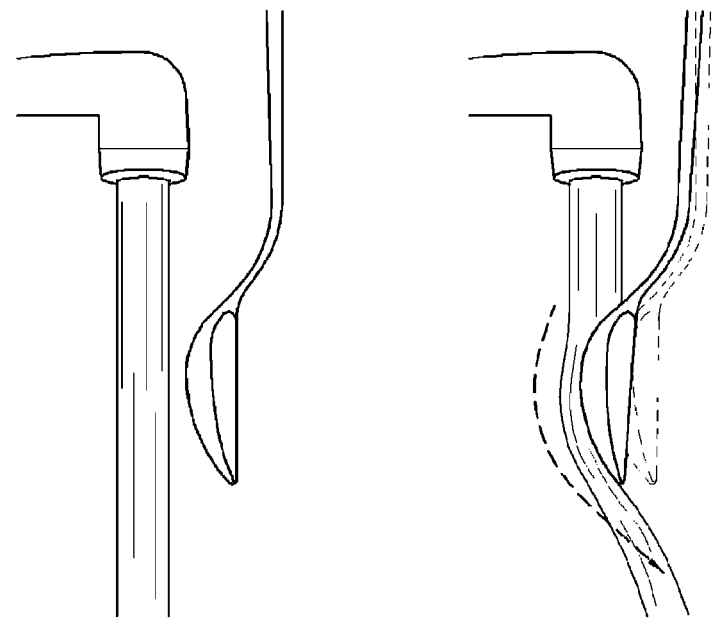
FIG. 2 is a schematic view for describing a Coanda Effect.

Referring to FIG. 2 when fluid (e.g., water) drops linearly, if a curved mechanism (e.g., a spoon) contacts the fluid, a drop direction of the fluid is changed along a curved surface of the mechanism, and such a phenomenon is called the Coanda Effect.

The present invention provides a hydrogen feed and recirculation device for a fuel cell system of a complex nozzle type in which a general first nozzle and the second nozzle using the Coanda Effect are combined.

Herein, a constitution of a hydrogen feed and recirculation device for a fuel cell system according to the present invention will be described below in detail.

Figure 3:
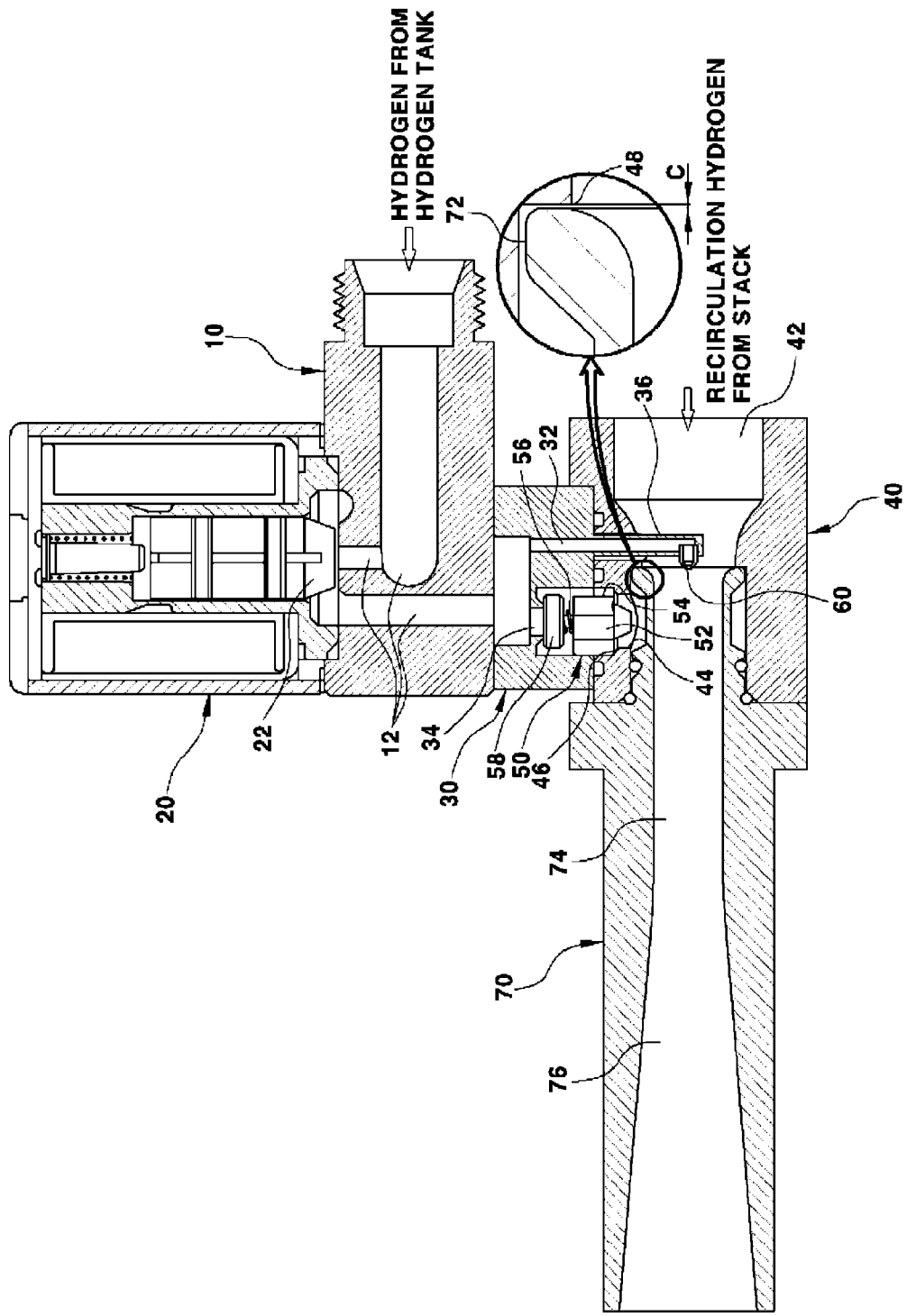
FIG. 3 is a cross-sectional view illustrating a hydrogen feed and recirculation device for a fuel cell system according to the present invention.

FIG. 3 is a cross-sectional view illustrating a hydrogen feed and recirculation device for a fuel cell system according to the present invention.

In FIG. 3, reference numeral 10 represents a first hydrogen supply block 10 to which hydrogen is supplied from a hydrogen tank.

A hydrogen supply path 12 through which the hydrogen from the hydrogen tank 100 passes is formed in the first hydrogen supply block 10.

Further, a flow control valve 20 that controls a hydrogen supply flow is mounted on the top of the first hydrogen supply block 10, and a plunger 22 of the flow control valve 20 serves to open/close the hydrogen supply path of the first hydrogen supply block 10.

In more detail, the flow control valve 20 performs an operation of lifting up and lifting down the plunger 22 by an electric signal, and an opening level of the hydrogen supply path 12 of the first hydrogen supply block 10 is controlled according to the lift-up or lift-down operation of the plunger 22.

A second hydrogen supply block 30 is mounted on the bottom of the first hydrogen supply block 10 to be communicatable, and as a result, the second hydrogen supply block 30 is provided in a structure in which a first hydrogen branch path 32 and a second hydrogen branch path 34 which are in communication with the hydrogen supply path 12 of the first hydrogen supply block 10 are vertically formed in the second hydrogen supply block 30.

Therefore, the hydrogen passing through the hydrogen supply path 12 of the first hydrogen supply block 10 flows to be distributed to the first hydrogen branch path 32 and the second hydrogen branch path 34.

A recirculation hydrogen supply block 40 is attached to the bottom of the second hydrogen supply block 30, and as a result, the recirculation hydrogen supply block 40 is provided in a structure in which a recirculation hydrogen inlet 42 for introducing the recirculated hydrogen from the stack penetrates horizontally.

Further, a mounting hole 44 which coincides with the second hydrogen branch path 34 penetrates on the top of the second hydrogen supply block 30 and when the pressure of hydrogen in the mounting hole 44 is high, a pilot valve 50 is mounted, which performs an opening operation to pass the hydrogen.

The pilot valve 50 is constituted by a hollow bush 54 and a valve sheet 58 which is inserted into the hollow bush 54 to be elastically restored via a spring 56.

In more detail, the hollow bush 54 is provided in a hollow structure in which a hydrogen through groove 52 is formed on a circumferential surface thereof to be seated in the mounting hole 44 formed on the top of the recirculation hydrogen supply block 40, and the valve sheet 58 is inserted into the hollow bush 54 to be elastically restored via the spring 56 to serve to open/close the second hydrogen branch path 34.

In this case, a suspension jaw 46 that supports a bottom circumferential portion of the hollow bush 54 is integrally formed so that the hollow bush 54 is stably seated on a lower inner diameter of the mounting hole 44 of the recirculation hydrogen supply block 40.

Accordingly, when hydrogen pressure at a predetermined level or more acts on the valve sheet 58, the valve sheet 58 is lifted down while compressing the spring 56 to open the second hydrogen branch path 34 and subsequently, the hydrogen from the second hydrogen branch path 34 flows toward a second nozzle 72 to be described below through the hydrogen through groove 52 of the hollow bush 54.

On the contrary, when hydrogen pressure at a predetermined level or less acts on the valve sheet 58, the valve sheet 58 is not lifted down and the second hydrogen branch path 34 is continuously closed by elastic restoration force of the spring 56.

Meanwhile, a first nozzle 60 disposed at the center of an inner diameter of the recirculation hydrogen supply block 40 is mounted on an end part of the first hydrogen branch path 32 of the second hydrogen supply block 30, and the first nozzle 60 serves to eject the hydrogen from the first hydrogen branch path 32 toward a mixing path 74 of a mixing diffusion pipe 70.

Preferably, an extension pipe 36 that extends to the center of the inner diameter of the recirculation hydrogen supply block 40 is formed at the end point of the first hydrogen branch path 32, and the first nozzle 60 is mounted on the end of the extension pipe 36.

More particularly, the first nozzle 60 is disposed at the center (the center of the inner diameter of the mixing diffusion pipe) of the second nozzle 72 using a Coanda Effect.

Herein, the mixing diffusion pipe 70 is inserted into and mounted on a proximal end of the recirculation hydrogen supply block 40.

Particularly, the second nozzle 72 that is inserted into and mounted on the proximal end of the recirculation hydrogen supply block 40 and ejects the hydrogen from the pilot valve 50 by using the Coanda Effect is formed on a rear end of the mixing diffusion pipe 70.

Further, a mixing path 74 having a straight cross section, which supplies the hydrogen ejected from the first nozzle 60 and the second nozzle 72 to the stack and a diffusion path 76 having a diameter which is gradually enlarged are sequentially formed at a rear end of the mixing diffusion pipe 70.

The second nozzle 72 is formed in a curved shape showing the Coanda Effect in order to eject the hydrogen passing through the pilot valve 50 by switching the direction of the hydrogen toward the inner diameter of the mixing diffusion pipe 70 and is integrally formed at the rear end of the mixing diffusion pipe 70 in a circumferential direction.

In this case, a guide partition 48 forming a hydrogen passing clearance C having a predetermined interval from the second nozzle 72 are integrally formed in the inner diameter part of the recirculation hydrogen supply block 40.

Accordingly, hydrogen which drops vertically through the pilot valve 50 is switched along the second nozzle 72 having the curved shape, which shows the Coanda Effect, and passes through the hydrogen passing clearance C between the second nozzle 72 and the guide partition 48, and thereafter is ejected toward the mixing path 74 of the mixing diffusion pipe 70.

Herein, an operational flow of the hydrogen feed and recirculation device for a fuel cell system according to the present invention, which has the constitution will be described below.

Low-Load Operation

Figure 4:
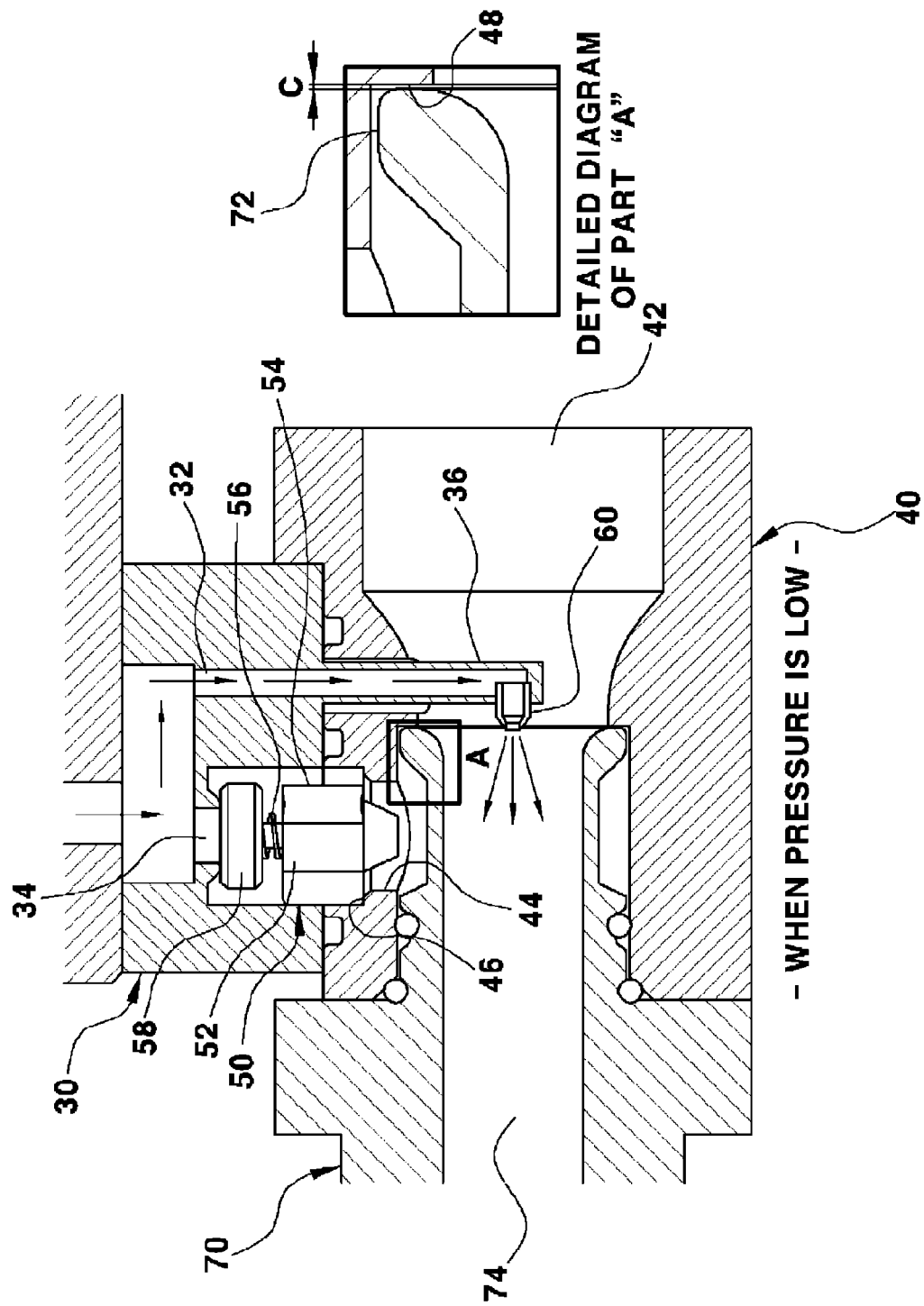
FIGS. 4 and 5 are cross-sectional views illustrating an operational state of the hydrogen feed and recirculation device for a fuel cell system according to the present invention.

FIG. 4 is a cross-sectional view illustrating an operating state of the hydrogen feed and recirculation device for a fuel cell system according to the present invention, which is in a low-load operation.

An opening/closing degree of the hydrogen supply path 12 of the first hydrogen supply block 10 increases/decreases according to the lift-up/down length of the plunger of the flow control valve 20 (illustrated in FIG. 3), and downstream hydrogen flow pressure of the hydrogen supply path 12 also increases/decreases.

That is, when an opening level of the hydrogen supply path 12 is small, the downstream hydrogen flow pressure decreases, and when the opening level is large, the downstream hydrogen flow pressure also increases.

Therefore, when the fuel cell system is in the low-load operation, the plunger 22 of the flow control valve 20 descends by the electric signal, and as a result, the opening level of the hydrogen supply path 12 is controlled to be small.

Therefore, when the hydrogen is supplied from the hydrogen tank to the first hydrogen supply block 10, the hydrogen passes through the hydrogen supply path 12 of which the opening level is controlled to be small to flow to the first hydrogen branch path 32 and the second hydrogen branch path 34 of the second hydrogen supply block 30.

When the hydrogen flow pressure passing through the hydrogen supply path 12 is low, the valve sheet 58 of the pilot valve 50 continuously closes the second hydrogen branch path 34 by the elastic restoration force of the spring 56.

Subsequently, the hydrogen passing through the hydrogen supply path 12 flows along the first hydrogen branch path 32, and thereafter is ejected toward the mixing path 74 of the mixing diffusion pipe 70 through the first nozzle 60.

In this case, the recirculated hydrogen (hydrogen unreacted and discharged from the stack) introduced into the recirculation hydrogen inlet 42 of the recirculation hydrogen supply block 40 is ejected toward the mixing path 74 of the mixing diffusion pipe 70 together by ejection pressure of the hydrogen ejected from the first nozzle 60.

Therefore, the hydrogen ejected from the first nozzle 60 and the recirculated hydrogen introduced into the recirculation hydrogen inlet 42 are mixed in the mixing path 74 of the mixing diffusion pipe 70, and thereafter are supplied to the stack through the diffusion path 76.

High-Load Operation

Figure 5:
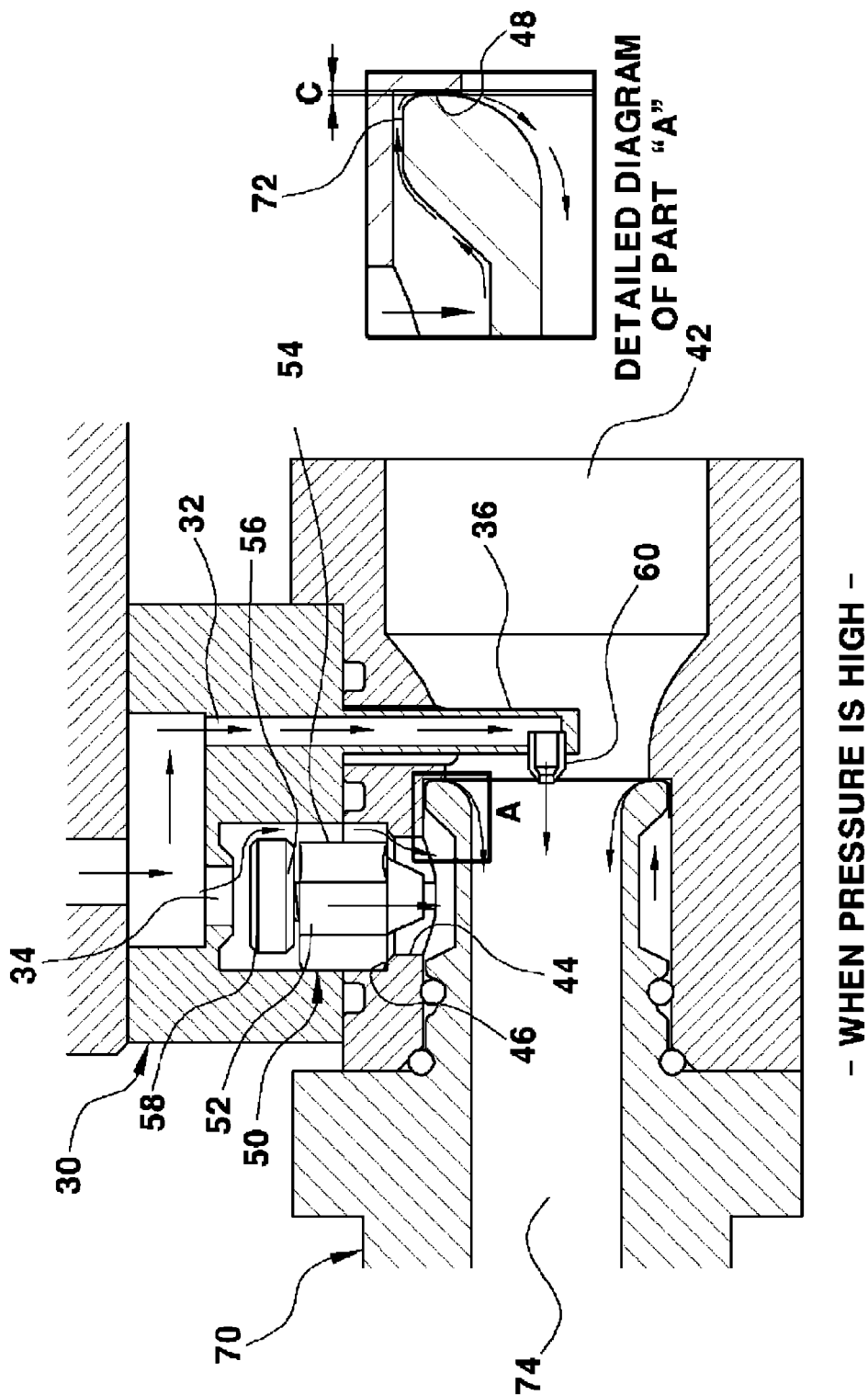

FIG. 5 is a cross-sectional view illustrating an operating state of the hydrogen feed and recirculation device for a fuel cell system according to the present invention, which is in a high-load operation.

When the fuel cell system is in a medium/high-load operation, the plunger 22 of the flow control valve 20 ascends/descends by the electric signal, and as a result, the opening level of the hydrogen supply path 12 is controlled to be large.

Therefore, when the hydrogen is supplied from the hydrogen tank to the first hydrogen supply block 10, the hydrogen passes through the hydrogen supply path 12 of which the opening level is controlled to be large to flow to the first hydrogen branch path 32 and the second hydrogen branch path 34 of the second hydrogen supply block 30.

In this case, since the hydrogen flow pressure passing through the hydrogen supply path 12 is high, when the valve sheet 58 of the pilot valve 50 is lifted down while compressing the spring 56 to open the second hydrogen branch path 34, the hydrogen from the second hydrogen branch path 34 flows toward the second nozzle 72 through the hydrogen through groove 52 of the hollow bush 54.

Subsequently, hydrogen, which drops vertically through the hydrogen through groove 52 of the hollow bush 54, is direction-switched along the second nozzle 72 having the curved shape, which shows the Coanda Effect, and passes through the hydrogen passing clearance C between the second nozzle 72 and the guide partition 48, and thereafter is ejected toward the mixing path 74 of the mixing diffusion pipe 70.

Simultaneously, the hydrogen passing through the hydrogen supply path 12 flows along the first hydrogen branch path 32, and thereafter is ejected toward the mixing path 74 of the mixing diffusion pipe 70 through the first nozzle 60.

In this case, the recirculated hydrogen (hydrogen unreacted and discharged from the stack) introduced into the recirculation hydrogen inlet 42 of the recirculation hydrogen supply block 40 is ejected toward the mixing path 74 of the mixing diffusion pipe 70 together by ejection pressure of the hydrogen ejected from the first nozzle 60 and the second nozzle 72.

Therefore, the hydrogen ejected from the first nozzle 60 and the second nozzle 72 and the recirculated hydrogen introduced into the recirculation hydrogen inlet 42 are mixed in the mixing path 74 of the mixing diffusion pipe 70, and thereafter are supplied to the stack through the diffusion path 76.

Figure 8A:
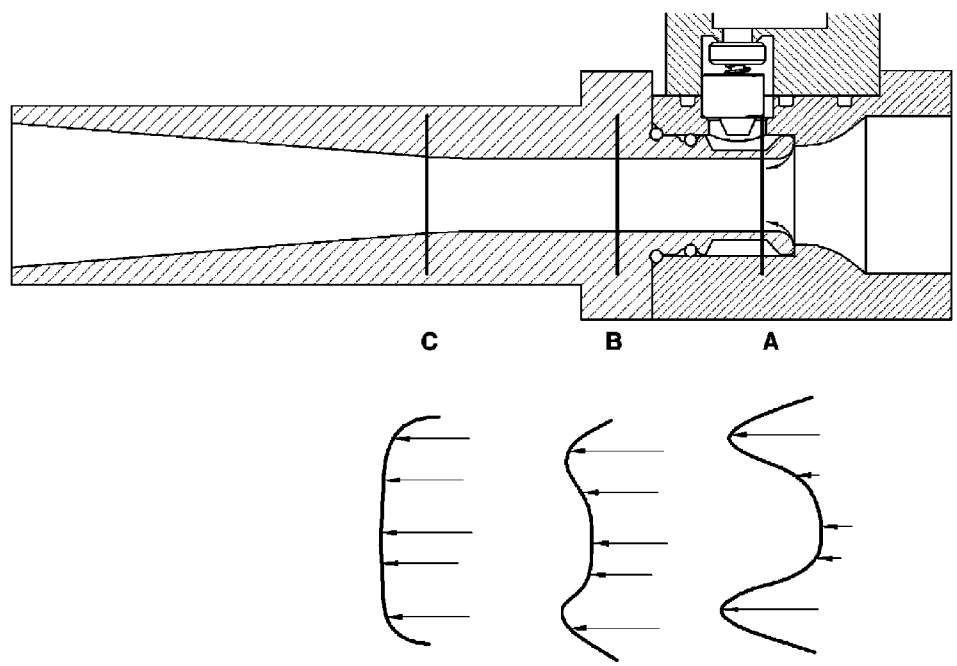
FIGS. 8A and 8B are speed distribution diagrams illustrating hydrogen flow rates when a first nozzle is positioned at the center of the second nozzle and when the first nozzle is not positioned at the center of the second nozzle in the hydrogen feed and recirculation device for a fuel cell system according to the present invention.

Meanwhile, as illustrated in FIG. 8A, when the hydrogen is ejected only from the second nozzle 72 using the Coanda Effect without the first nozzle 60, a flow rate of the hydrogen in the mixing diffusion pipe 70 is higher at the outside than at the center, and as a result, hydrogen supply efficiency to the stack may deteriorate.

Figure 8B:
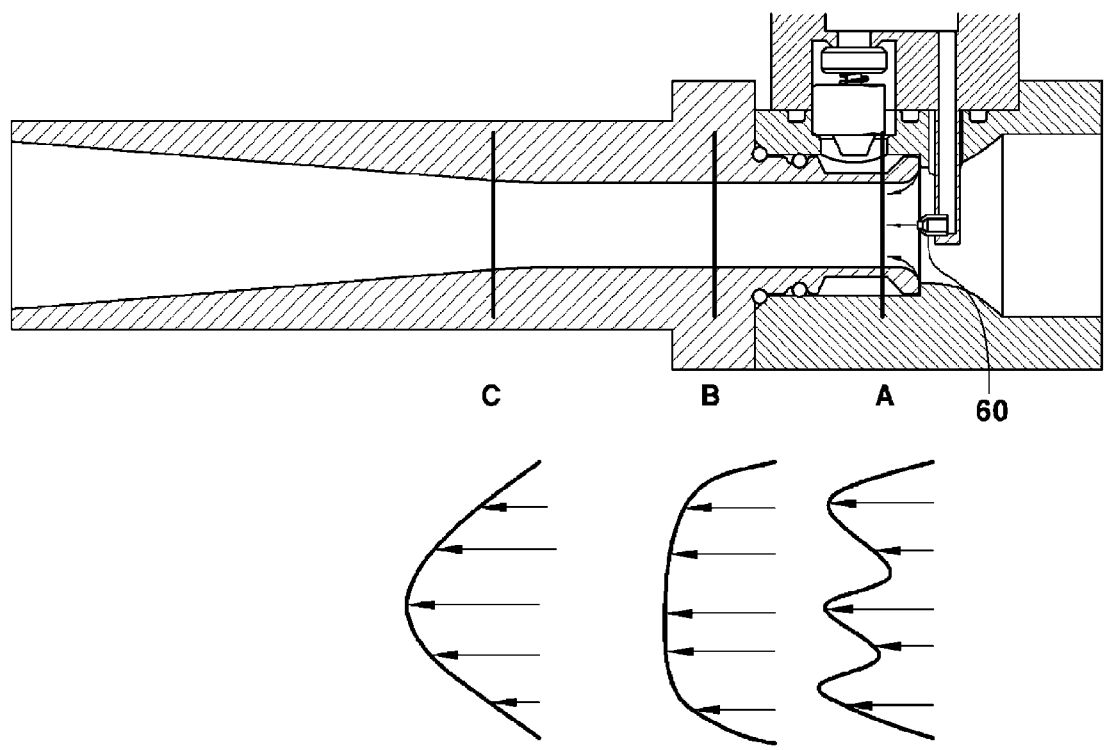

On the contrary, as illustrated in FIG. 8B, when the hydrogen is ejected from both the first nozzle 60 and the second nozzle 72 using the Coanda Effect, the flow rate of the hydrogen in the mixing diffusion pipe 70 is higher at the center than at the outside, and as a result, the hydrogen may be smoothly supplied to the stack.

Consequently, when the first nozzle 60 and the second nozzle 72 using the Coanda Effect are combined, the hydrogen supply efficiency to the stack may increase and to this end, the first nozzle 60 may be disposed at the center (the center of the inner diameter of the mixing diffusion pipe) of the second nozzle 72 using the Coanda Effect.

Figure 6:
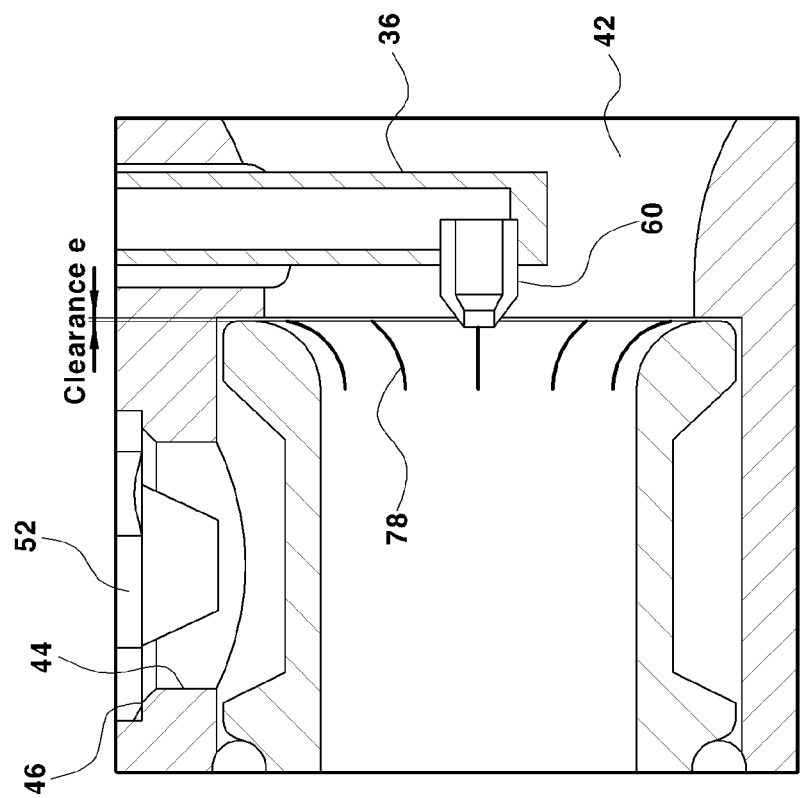
FIG. 6 is a schematic view illustrating slit holes formed in a second nozzle of the hydrogen feed and recirculation device for a fuel cell system according to the present invention.
Figure 7A:
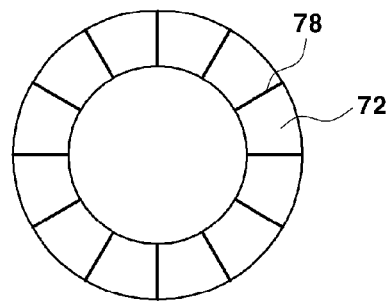
FIGS. 7A-7D are schematic views illustrating an embodiment in which slit holes are formed in the second nozzle of the hydrogen feed and recirculation device for a fuel cell system according to the present invention.
Figure 7B:
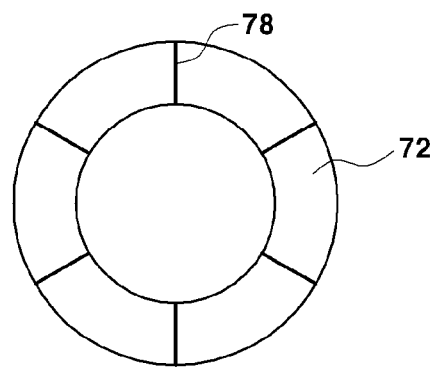
Figure 7C:
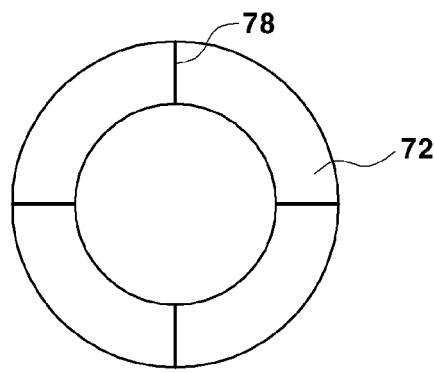
Figure 7D:
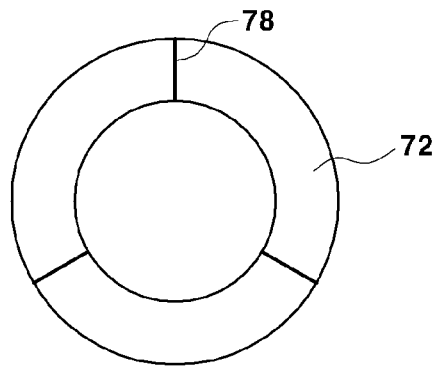

Herein, as another embodiment of the present invention, as illustrated in FIG. 6, a plurality of slit holes 78 at an equal interval are further formed in the second nozzle 72 in a circumferential direction in order to control a hydrogen ejection amount.

The reasons for forming the slit holes 78 are described below.

The hydrogen passing clearance C between the second nozzle 72 and the guide partition 48 is generally determined at a level of approximately 0.1 to 0.25 mm, and as a result, vapor of the hydrogen recirculation gas may be condensed and frozen in the small clearance C after the fuel cell system stops and it is very difficult to precisely manage a clearance size even in terms of productivity.

By such a point, the plurality of slit holes 78 are formed in the second nozzle 72 in order to secure the hydrogen passing clearance C between the second nozzle 72 and the guide partition 48.

In this case, a forming interval and the number of the slit holes 78 may be determined according to the hydrogen passing clearance C between the second nozzle 72 and the guide partition 48.

For example, as illustrated in FIGS. 7A-7D, when the hydrogen passing clearance C has a size of 0.1 mm, multiple slit holes 78 forming an interval of approximately 20 to 30° are formed in the second nozzle 72; when the hydrogen passing clearance C has a size of 0.15 mm, the slit holes 78 forming an interval of approximately 60° are formed in the second nozzle 72; when the hydrogen passing clearance C has a size of 0.2 mm, slit holes 78 forming an interval of approximately 90° are formed in the second nozzle 72; and when the hydrogen passing clearance C has a size of 0.25 mm, the slit holes 78 forming an interval of approximately 120° are formed in the second nozzle 72.

As described above, a hydrogen feed and recirculation device for a fuel cell system of a complex nozzle type in which the first nozzle performing a general ejection operation and the second nozzle using the Coanda Effect are combined is provided to satisfy a required hydrogen supply amount to the stack throughout an entire operating area of the fuel cell and prevent nozzle vibration and noise generation in the related art.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A hydrogen feed and recirculation device for a fuel cell system, the device comprising:
   a first hydrogen supply block having a hydrogen supply path through which hydrogen from a hydrogen tank passes;
   a flow control valve attached to the first hydrogen supply block to open/close the hydrogen supply path;
   a second hydrogen supply block provided in a structure having a first hydrogen branch path and a second hydrogen branch path which are in communication with the hydrogen supply path of the first hydrogen supply block and attached to the first hydrogen supply block;
   a recirculation hydrogen supply block provided in a structure having a recirculation hydrogen inlet for introducing recirculated hydrogen from a stack and attached to the second hydrogen supply block;
   a pilot valve mounted to the second hydrogen branch path;
   a first nozzle mounted on the first hydrogen branch path and disposed at the center of the recirculation hydrogen supply block; and
   a mixing diffusion pipe having a second nozzle inserted into and mounted on a proximal end of the recirculation hydrogen supply block and ejecting the hydrogen from the pilot valve by using a Coanda Effect at a rear part of the mixing diffusion pipe, and a mixing path and a diffusion path supplying the hydrogen ejected from the first nozzle and the second nozzle and the recirculated hydrogen to the stack at a front end of the mixing diffusion pipe, wherein the first nozzle is positioned at a center of an inlet of the mixing diffusion pipe.

2. The device of claim 1, wherein the pilot valve includes a hollow bush provided in a hollow structure in which a hydrogen through groove is formed on a circumferential surface of the pilot valve and seated in a mounting hole formed on the top of the recirculation hydrogen supply block and a valve sheet inserted into the hollow bush to be elastically restored via a spring to open/close the second hydrogen branch path.

3. The device of claim 2, wherein a suspension jaw on which the hollow bush is seated is formed in an inner diameter of the mounting hole formed in the recirculation hydrogen supply block.

4. The device of claim 1, wherein an extension pipe that extends to the center of the inner diameter of the recirculation hydrogen supply block is formed on the first hydrogen branch path and the first nozzle is mounted to the end of the extension pipe.

5. The device of claim 1, wherein the first nozzle is disposed at the center of the second nozzle using the Coanda Effect.

6. The device of claim 1, wherein the second nozzle is formed in a curved shape showing the Coanda Effect in order to direction-switch and eject the hydrogen from the pilot valve to the inner diameter of the mixing diffusion pipe and is integrally formed at a rear end of the mixing diffusion pipe in a circumferential direction.

7. The device of claim 6, wherein a guide partition forming a hydrogen passing clearance having a predetermined interval with the second nozzle is integrally formed in the inner diameter part of the recirculation hydrogen supply block.

8. The device of claim 6, wherein a plurality of slit holes formed at an equal interval in a circumferential direction are further formed in the second nozzle in order to control a hydrogen ejection amount.

9. The device of claim 8, wherein a forming interval and the number of the slit holes are determined according to the hydrogen passing clearance between the second nozzle and the guide partition.

* * * * *